(12) United States Patent
Chan

(10) Patent No.: US 10,721,804 B2
(45) Date of Patent: Jul. 21, 2020

(54) LIGHT-EMITTING DIODE DRIVING CIRCUIT

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 16/421,453

(22) Filed: May 23, 2019

(65) Prior Publication Data

US 2020/0178362 A1    Jun. 4, 2020

(30) Foreign Application Priority Data

Nov. 30, 2018   (TW) .............................. 107216268 U

(51) Int. Cl.
*H05B 33/08*     (2020.01)
*H05B 45/30*     (2020.01)
*H05B 45/395*    (2020.01)
*H05B 47/10*     (2020.01)

(52) U.S. Cl.
CPC ........... *H05B 45/395* (2020.01); *H05B 47/10* (2020.01)

(58) Field of Classification Search
CPC .............. H05B 33/08; H05B 33/0809; H05B 33/0812; H05B 33/0815; H05B 33/0824; H05B 33/0848; H05B 33/083; H05B 33/0845; H05B 37/00; H05B 37/02; H05B 45/30; H05B 45/37; H05B 45/395; H05B 47/10; H05B 47/105
See application file for complete search history.

(56) References Cited

U.S. PATENT DOCUMENTS

| | | | | |
|---|---|---|---|---|
| 8,044,609 B2* | 10/2011 | Liu | ...................... | H05B 33/086 315/291 |
| 9,088,755 B2* | 7/2015 | Luo | ...................... | H05B 33/086 |
| 9,439,258 B2* | 9/2016 | Kim | .................... | H05B 33/0809 |
| 9,572,210 B2* | 2/2017 | Kim | ...................... | H05B 33/083 |
| 2008/0054815 A1* | 3/2008 | Kotikalapoodi | .... | H05B 33/0815 315/192 |
| 2009/0187925 A1* | 7/2009 | Hu | ...................... | H05B 33/0815 719/327 |
| 2011/0148323 A1* | 6/2011 | Yao | ..................... | H05B 33/0827 315/295 |

* cited by examiner

*Primary Examiner* — Thai Pham
(74) *Attorney, Agent, or Firm* — Winston Hsu

(57) ABSTRACT

A light-emitting diode (LED) driving circuit may include: a power supply circuit, arranged to provide power to a first set of LEDs and a second set of LEDs; a first linear current regulator and a second linear current regulator, where any linear current regulator of the linear current regulators and a corresponding set of LEDs within the sets of LEDs are coupled to each other in series and coupled between a power terminal and a ground terminal of the power supply circuit; and a control circuit, coupled to the linear current regulators, arranged to control the linear current regulators to drive the sets of LEDs, respectively, to make currents respectively passing through the sets of LEDs be substantially equal to each other. Aforementioned any linear current regulator may include a comparator, a power switch, and a resistor, and the control circuit may include a detection circuit and parameter control circuits.

18 Claims, 2 Drawing Sheets

LIGHT-EMITTING DIODE DRIVING CIRCUIT

BACKGROUND OF THE INVENTION

1. Field of the Invention

The present invention relates to light source control, and more particularly, to a light-emitting diode (LED) driving circuit.

2. Description of the Prior Art

LED light sources have been widely applied to various kinds of electronic devices. For example, most of liquid crystal displays (LCDs) currently launched on the market may adopt LEDs as the light sources of the backlight modules. While an LED light source is designed as using the same voltage to drive multiple sets of LEDs respectively located on different current paths, a portion of voltage drops of this input voltage may be applied across other elements on these current paths respectively, thus causing more power consumption. The brightness of the LEDs is proportional to the currents following thereon, respectively, and the currents on theses paths can be controlled to be equal to each other, in order to make the multiple sets of LEDs have the same brightness. In general, it is hard to make the respective load resistance of the multiple sets of LEDs be identical. To ensure a set of LEDs with the largest load resistance can still be driven by a sufficient amount of voltage, the input voltage has to be large enough. Since the load resistance of each of other sets of LEDs is less than the largest load resistance, there will be more remaining cross-voltages in the respective current paths of the other sets of LEDs, which typically causes additional power consumption. For example, the ideal value of the driving voltage of a single LED may be 3.5 Volts (V), but the variation range of the actual value of this driving voltage may reach 0.6 V. If there are 12 LEDs in each set of the multiple sets of LEDs, the variation range of the total driving voltage may reach 7.2 V, which may reach 10% or more of the input voltage. This means the additional power consumption is quite large. If there are more LEDs in each set of LEDs, the additional power consumption may become much greater. Hence, there is a need for a novel architecture to reduce the overall power consumption without introducing a side effect or in a way that is less likely to introduce a side effect.

SUMMARY OF THE INVENTION

An objective of the present invention is to provide a light-emitting diode (LED) driving circuit, in order to solve the aforementioned problem.

Another objective of the present invention is to provide an LED driving circuit, in order to reach the optimal performance without introducing a side effect or in a way that is less likely to introduce a side effect.

At least one embodiment of the present invention provides an LED driving circuit. The LED driving circuit may comprise a power supply circuit, a first linear current regulator, a second linear current regulator, and a control circuit. The power supply circuit may have a power terminal and a ground terminal, and the power supply circuit may be arranged to provide power to a first set of LEDs and a second set of LEDs. The first linear current regulator and the second linear current regulator are respectively coupled to the first set of LEDs and the second set of LEDs, wherein any linear current regulator within the first linear current regulator and the second linear current regulator is coupled to a corresponding set of LEDs within the first set of LEDs and the second set of LEDs in series, and the aforementioned any linear current regulator and the corresponding set of LEDs are coupled between the power terminal and the ground terminal of the power supply circuit. The aforementioned any linear current regulator may comprise a comparator, a power switch and a resistor. The comparator may have a first input terminal, a second input terminal, and an output terminal. The power switch may have a first terminal, a second terminal and a control terminal that are respectively coupled to the corresponding set of LEDs, the second input terminal and the output terminal of the comparator. The resistor is coupled between the second terminal of the power switch and the ground terminal. In addition, the control circuit is coupled to the first linear current regulator and the second linear current regulator. The control circuit is arranged to control the first linear current regulator and the second linear current regulator to respectively drive the first set of LEDs and the second set of LEDs, to make a first current and a second current respectively passing through the first set of LEDs and the second set of LEDs be substantially equal to each other. The control circuit may comprise a detection circuit, a first parameter control circuit and a second parameter control circuit. The detection circuit is coupled to a node between the corresponding set of LEDs and the aforementioned any linear current regulator, and is arranged to perform detection according to a voltage signal at the node, to generate a detection signal. The first parameter control circuit is arranged to control a first parameter of the aforementioned any linear current regulator. The second parameter control circuit is coupled to the detection circuit, and is arranged to control a second parameter of the aforementioned any linear current regulator according to the detection signal. Additionally, the first input terminal and the output terminal of the comparator are respectively coupled to the first parameter control circuit and the second parameter control circuit within the control circuit, and the first parameter and the second parameter represent respective voltages of the first input terminal and the output terminal of the comparator, respectively.

At least one embodiment of the present invention provides a feed-forward control diver for driving multiple sets of LEDs. The feed-forward control diver comprises a power supply circuit, a plurality of linear current regulators and a control circuit. The power supply circuit has a power terminal and a ground terminal, and is arranged to provide power to said multiple sets of LEDs. The plurality of linear current regulators are coupled to said multiple sets of LEDs respectively. Any linear current regulator within said plurality of linear current regulators is coupled to a corresponding set of LEDs within said multiple sets of LEDs, and is coupled between the power terminal and the ground terminal of the power supply circuit. The control circuit is coupled to said plurality of linear current regulators, and is arranged to control said plurality of linear current regulators in order to drive said multiple sets of LEDs by using dynamically adjusted currents respectively, wherein the control circuit performs feed-forward control upon said plurality of linear current regulators, in order to achieve an optimal performance of the feed-forward control driver.

An advantage provided by the present invention is that, through feed-forward control and associated parameter adjustment, the present invention can perform proper control on the operations of the linear current regulators, and more particularly, can minimize the overall power consumption while maintaining the uniform brightness of the LED light source. In comparison with the related art techniques, the present invention can reach the optimal performance without introducing a side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
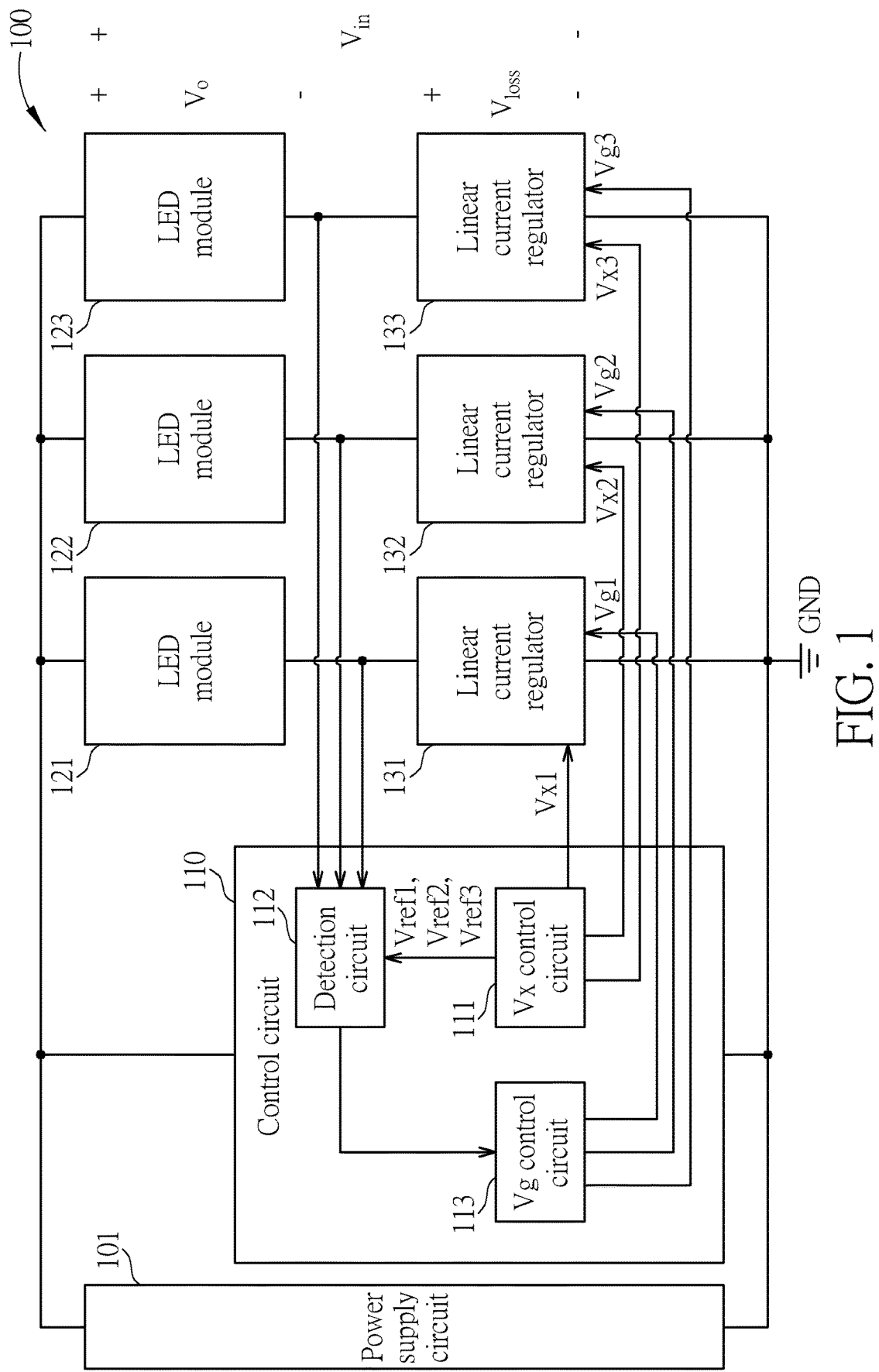
FIG. 1 is a diagram illustrating an LED driving circuit according to an embodiment of the present invention.

FIG. 1 is a diagram illustrating an LED driving circuit 100 according to an embodiment of the present invention, wherein each set of LEDs within the multiple sets of LEDs shown in FIG. 1 may be coupled to each other in series to form an LED module, such as one of the LED modules 121, 122 and 123. The LED driving circuit 100 may comprise a power supply circuit 101, a control circuit 110 and a plurality of linear current regulators respectively coupled to the multiple sets of LEDs (e.g. multiple LED modules). The control circuit 110 may comprise a detection circuit 112, and a plurality of parameter control circuits for respectively controlling a plurality of parameters, such as a first parameter control circuit and a second parameter control circuit for controlling the first parameter and second parameter respectively. In this embodiment, the plurality of linear current regulators may be implemented as three linear current regulators 131, 132 and 133 respectively coupled to three LED modules 121, 122 and 123. The first parameter control circuit and the second parameter control circuit may be implemented as a Vx control circuit 111 and a Vg control circuit 113 for controlling voltages {Vx} and {Vg}, respectively. The voltages {Vx} (e.g. the voltages {Vx1, Vx2, Vx3}) and the voltages {Vg} (e.g. the voltages {Vg1, Vg2, Vg3}) may be taken as examples of the first parameters and the second parameters, respectively.

According to this embodiment, the power supply circuit 101 may have a power terminal and a ground terminal (e.g. the upper terminal and the lower terminal thereof), and the power terminal and the ground terminal may be arranged to provide power to the multiple sets of LEDs. Any linear current regulator in the plurality of linear current regulators is coupled to a corresponding set of LEDs within the multiple sets of LEDs in series, and the aforementioned any linear current regulator and the corresponding set of LEDs are coupled between the power terminal and the ground terminal of the power supply circuit 101, wherein the corresponding set of LEDs is coupled between the power terminal and the aforementioned any linear current regulator. For example, the linear current regulators 131, 132 and 133 are coupled to the LED modules 121, 122 and 123 in series, respectively. For better comprehension, the voltage level of the ground GND may be 0 V, and the driving voltage outputted by the power supply circuit 101 may be Vin. In this situation, the cross-voltage between the power terminal and the ground terminal such as the voltage $V_{in}$ may be equal to the voltage Vin (e.g. $V_{in}$=(Vin−0)=Vin). If the cross-voltage of the corresponding set of LEDs is $V_o$, and the cross-voltage of the aforementioned any linear current regulator is $V_{loss}$, then $V_{loss}=V_{in}-V_o$, where the voltage $V_{loss}$ must reach (e.g. greater than or equal to) the operating condition of this linear current regulator so as to maintain normal operations, and the current $I_o$ passing through this set of LEDs may be controlled by this linear current regulator. For example, the respective cross-voltages of the LED modules 121, 122 and 123 may be $V_o(1)$, $V_o(2)$ and $V_o(3)$ (which may be respectively referred to as Vo1, Vo2 and Vo3, for brevity), respectively, and the respective cross-voltages of the linear current regulators 131, 132 and 133 may be the voltages $V_{loss}(1)$, $V_{loss}(2)$ and $V_{loss}(3)$, respectively. At a certain time point, the respective power consumption of the linear current regulators 131, 132 and 133 may be proportional to the voltages $V_{loss}(1)$, $V_{loss}(2)$ and $V_{loss}(3)$, respectively, where $V_{loss}(1)=V_{in}-V_o(1)$, $V_{loss}(2)=V_{in}-V_o(2)$, and $V_{loss}(3)=V_{in}-V_o(3)$.

Further, the control circuit 110 may be arranged to control the plurality of linear current regulators such as the linear current regulators 131, 132 and 133 to drive the multiple sets of LEDs such as the LED modules 121, 122 and 123 through dynamically adjusted currents such as the currents $I_o(1)$, $I_o(2)$ and $I_o(3)$ (which may be respectively referred to as Io1, Io2 and Io3, for brevity), respectively, and more particularly, may be arranged to perform feed-forward control on the plurality of linear current regulators, to reach the optimal performance of the LED driving circuit 100. The aforementioned each set of LEDs (e.g. one of the LED modules 121, 122 and 123) may be driven by one of the dynamically adjusted currents. The control circuit 110 may dynamically adjust the currents $I_o(1)$, $I_o(2)$ and $I_o(3)$, and may drive the LED modules 121, 122 and 123 via the currents $I_o(1)$, $I_o(2)$ and $I_o(3)$, respectively. In this embodiment, the detection circuit 112 may be coupled to a node between the corresponding set of LEDs and the aforementioned any linear current regulator, and may perform detection according to a voltage signal at the node to generate a detection signal, for the control circuit 110 to perform feed-forward control on the aforementioned any linear current regulator. For example, the detection circuit 112 may perform detection according to a first voltage signal at a first node between the LED module 121 and the linear current regulator 131, a second voltage signal at a second node between the LED module 122 and the linear current regulator 132, and a third voltage signal at a third node between the LED module 123 and the linear current regulator 133 to generate a first detection signal, a second detection signal and a third detection signal, respectively. The first parameter control circuit such as the Vx control circuit 111 may control the respective first parameters (e.g. the voltages {Vx1, Vx2, Vx3}) of the linear current regulators 131, 132 and 133, and the second parameter control circuit such as the Vg control circuit 113 may control the respective second parameter (e.g. the voltages {Vg1, Vg2, Vg3}) of the linear current regulators 131, 132 and 133 according to the first detection signal, the second detection signal and the third detection signal, respectively. In this embodiment, the first parameter control circuit such as the Vx control circuit 111 may generate the reference voltages Vref1, Vref2 and Vref3, and the detection circuit 112 may perform detection based on the reference voltages Vref1, Vref2 and Vref3 to generate the first detection signal, the second detection signal and the third detection signal, respectively.

Figure 2:
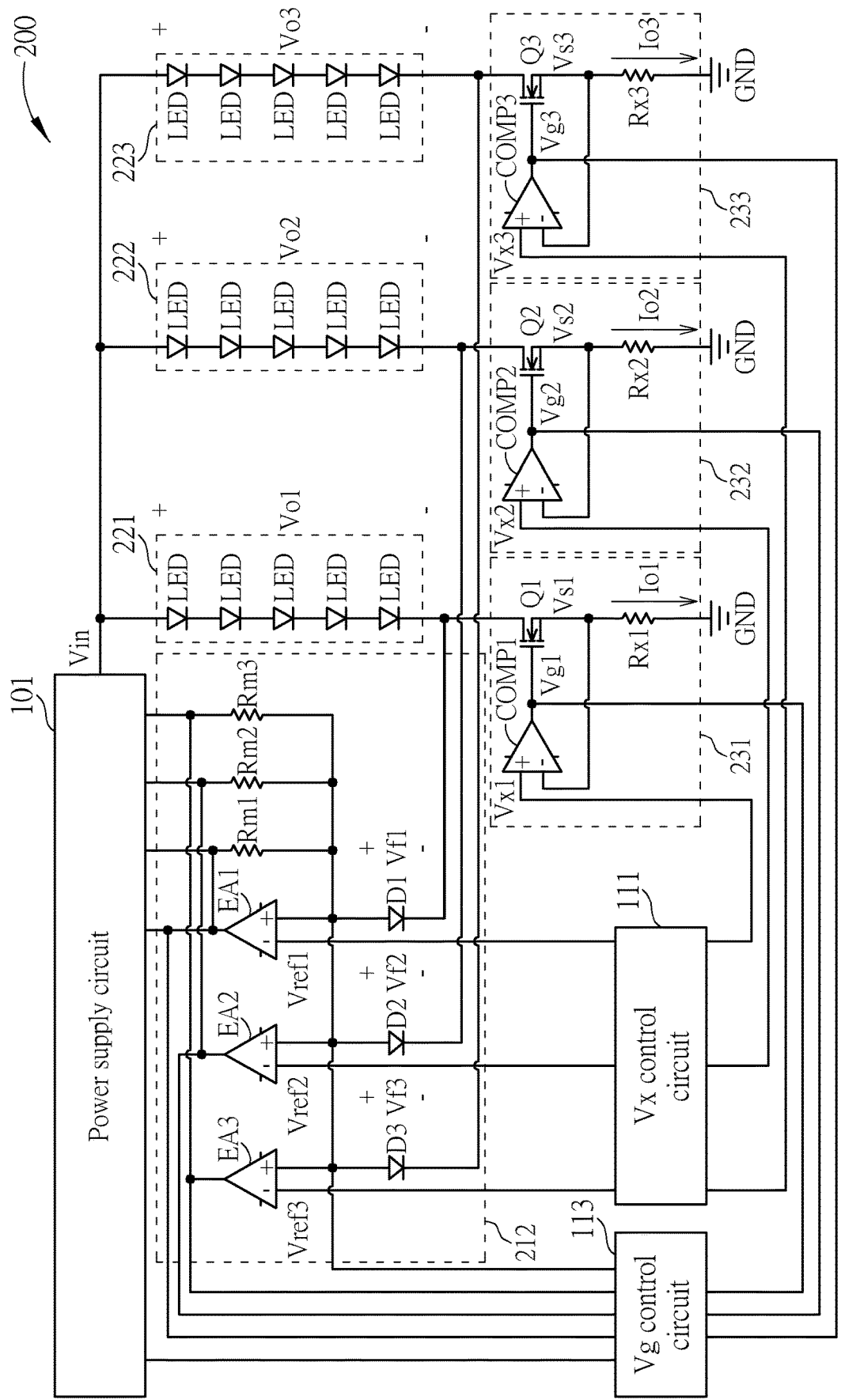
FIG. 2 is a diagram illustrating implementation details of the LED driving circuit shown in FIG. 1 according to an embodiment of the present invention.

FIG. 2 is a diagram illustrating implementation details of the LED driving circuit 100 shown in FIG. 1 according to an embodiment of the present invention. The LED driving circuit 200 in this embodiment may be taken as an example of the LED driving circuit 100, where the LED modules 221, 222 and 223 may be taken as examples of the LED modules 121, 122 and 123, respectively, the linear current regulators 231, 232 and 233 may be taken as examples of the linear current regulators 131, 132 and 133, respectively, and the detection circuit 212 may be taken as an example of the detection circuit 112. For better comprehension, 5 LEDs that are electrically connected in series are illustrated in each LED module within the LED modules 221, 222 and 223. In some embodiments, the number of LEDs of the aforementioned each LED module may be modified.

According to this embodiment, the linear current regulator 231 may comprise a comparator COMP1, a power switch Q1 and a resistor Rx1, the linear current regulator 232 may comprise a comparator COMP2, a power switch Q2 and a resistor Rx2, and the linear current regulator 233 may comprise a comparator COMP3, a power switch Q3 and a resistor Rx3. For example, the comparator COMP1 may have a first input terminal (e.g. the non-inverting input terminal "+"), a second input terminal (e.g. the inverting input terminal "−") and an output terminal, where the first input terminal and the output terminal of the comparator COMP1 are respectively coupled to the Vx control circuit 111 and the Vg control circuit 113 in the control circuit 110, and the first parameter and the second parameter of the comparator COMP1 may represent the voltage at the first input terminal of the comparator COMP1 and the voltage at the output terminal of the comparator COMP1 (e.g. the voltages Vx and Vg), respectively. The power switch Q1 may have a first terminal, a second terminal and a control terminal (e.g. the upper terminal, the lower terminal and the left-hand side terminal thereof, such as the drain terminal, the source terminal and the gate terminal) respectively coupled to the LED module 221, the second input terminal of the comparator COMP1 and the output terminal of the comparator COMP1. The resistor Rx1 is coupled between the second terminal of the power switch Q1 and the ground terminal, for example, may be coupled between the voltage Vs1 and the ground GND. Since the respective components of the linear current regulators 232 and 233 and the coupling manner thereof are similar to those of the linear current regulator 231, similar descriptions are omitted here for brevity. Please note that, based on the parameter control of the Vx control circuit 111 and the Vg control circuit 113 the linear current regulators 231, 232 and 233 may control the respective voltages Vs1, Vs2 and Vs3 thereof and the respective currents Io1, Io2 and Io3 thereof, respectively.

In addition, the detection circuit 212 comprises a plurality of sub-circuits respectively corresponding to the plurality of linear current regulators, such a first sub-circuit, a second sub-circuit and a third sub-circuit respectively corresponding to the linear current regulators 231, 232 and 233, where the first sub-circuit comprises a diode D1, an error amplifier EA1 and a resistor Rm1, the second sub-circuit comprises a diode D2, an error amplifier EA2 and a resistor Rm2, and the third sub-circuit comprises a diode D3, an error amplifier EA3 and a resistor Rm3. For example, the diode D1 may have a first terminal and a second terminal (e.g. the upper terminal and the lower terminal thereof), and the cross-voltage thereof (such as the voltage difference between these two terminals) may be the voltage Vf1, where the second terminal of the diode D1 is coupled to the first node. The error amplifier EA1 may have a first input terminal (e.g. the non-inverting input terminal "+"), a second input terminal (e.g. the inverting input terminal "−") and an output terminal, where the first input terminal and the second input terminal of the error amplifier EA1 are respectively coupled to the first terminal of the diode D1 and the reference voltage Vref1, the output terminal of the error amplifier EA1 outputs the first detection signal, and the resistor Rm1 is coupled between the first input terminal and the output terminal of the error amplifier EA1. In another example, the diode D2 may have a first terminal and a second terminal (e.g. the upper terminal and the lower terminal thereof), and the cross-voltage thereof (such as the voltage difference between these two terminals) may be the voltage Vf2, where the second terminal of the diode D2 is coupled to the second node. The error amplifier EA2 may have a first input terminal (e.g. the non-inverting input terminal "+"), a second input terminal (e.g. the inverting input terminal "−") and an output terminal, where the first input terminal and the second input terminal of the error amplifier EA2 are respectively coupled to the first terminal of the diode D2 and the reference voltage Vref2, the output terminal of the error amplifier EA2 outputs the second detection signal, and the resistor Rm2 is coupled between the first input terminal and the output terminal of the error amplifier EA2. In another example, the diode D3 may comprise a first terminal and a second terminal (e.g. the upper terminal and the lower terminal thereof), and the cross-voltage thereof (such as the voltage difference between these two terminals) may be the voltage Vf3, where the second terminal of the diode D3 is coupled to the third node. The error amplifier EA3 may have a first input terminal (e.g. the non-inverting input terminal "+"), a second input terminal (e.g. the inverting input terminal "−") and an output terminal, where the first input terminal and the second input terminal of the error amplifier EA3 are respectively coupled to the first terminal of the diode D3 and the reference voltage Vref3, the output terminal of the error amplifier EA3 outputs the third detection signal, and the resistor Rm3 is coupled between the first input terminal and the output terminal of the error amplifier EA3.

For better comprehension, the associated implementation details of the LED driving circuit 200 are further described as follows. According to some embodiments, the diodes D1, D2 and D3 may be arranged to detect the voltages of the respective negative terminals (e.g. the cathodes) of the LED modules 221, 222 and 223 (i.e. the respective cross voltages of the linear current regulators 231, 232 and 233, such as the voltages $V_{loss}(1)$, $V_{loss}(2)$ and $V_{loss}(3)$), respectively. For example, the voltages at the respective first input terminals (e.g. the non-inverting input terminals "+") of the error amplifiers EA1, EA2 and EA3 may be the voltages ($V_{loss}(1)+Vf1$), ($V_{loss}(2)+Vf2$) and ($V_{loss}(3)+Vf3$), respectively. The control circuit 110 may dynamically adjust the first parameters (e.g. the voltages {Vx1, Vx2, Vx3}) and the second parameters (e.g. the voltages {Vg1, Vg2, Vg3}), and the goal of the adjustment is to control the voltages $V_{loss}(1)$, $V_{loss}(2)$ and $V_{loss}(3)$ to approach or approximate to zero, respectively, thereby making the corresponding power consumption approach or approximate zero. The voltages at the respective second input terminals (e.g. the inverting input terminals "−") of the error amplifiers EA1, EA2 and EA3 may be the reference voltages Vref1, Vref2 and Vref3, respectively. With the aid of the error amplifiers EA1, EA2 and EA3, the control circuit 110 may determine corresponding regulated voltage values according to feedback signals such as the first detection signal, the second detection signal and the third detection signal. For example, the power switches Q1, Q2 and Q3 may be implemented as transistors such as power transistors, and the Vg control circuit 113 may search for optimal gate driving voltages for the power switches Q1, Q2 and Q3 as the voltages {Vg1, Vg2, Vg3}, respectively, and adjust the load currents to optimize the efficiency of the LED modules 221, 222 and 223.

According to some embodiment, the power switches Q1, Q2 and Q3 such as the power transistors may be required to operate in the linear region, that is, for each power transistor within the power transistors, $V_{gs}-V_{th}>V_{ds}$, where $V_{gs}$ represents the gate-to-source voltage, $V_{ds}$ represents the drain-to-source voltage, and $V_{th}$ represents the threshold voltage. For example, the respective gate-to-source voltages $V_{gs}(1)$, $V_{gs}(2)$ and $V_{gs}(3)$ of the power switches Q1, Q2 and Q3 may be (Vg1–Vs1), (Vg2–Vs2) and (Vg3–Vs3), respectively, and the respective drain-to-source voltages $V_{ds}(1)$, $V_{ds}(2)$ and $V_{ds}(3)$ of the power switches Q1, Q2 and Q3 may be ($V_{loss}(1)$–Vs1), ($V_{loss}(2)$–Vs2) and ($V_{loss}(3)$–Vs3), respectively. In addition, the comparators COMP1, COMP2 and COMP3 such as operational amplifiers may be required to operate in the saturation region.

For example, for the power switch in the aforementioned any linear current regulator (e.g. one of the power switches Q1, Q2 and Q3), such as a certain power transistor within the power transistors, $V_{gs}-V_{th}>V_{ds}$, which means $V_{gs}-V_{ds}>V_{th}$, which may be expressed as follows:

$$V_{gd}>V_{th}; \text{ or}$$

$$V_g-V_d>V_{th};$$

where $V_{gd}$ represents the gate-to-drain voltage, such as the voltage difference ($V_g-V_d$) between the gate voltage $V_g$ and the drain voltage $V_d$. Since the drain terminal of this power transistor is directly connected to the node, it can be obtained that $V_d=V_{loss}$. Given that $V_{loss}=V_{in}-V_o$, assuming $R_o$ represents the resistor of the corresponding set of LEDs (e.g. a corresponding LED module, such as one of the LED modules 221, 222 and 223), the following equations can be derived:

$$V_d=V_{loss}=V_{in}-V_o=V_{in}-I_o*R_o; \text{ or}$$

$$V_d=V_{in}-I_o*R_o;$$

By substituting $V_d=V_{in}-I_o*R_o$ into $V_g-V_d>V_{th}$, the following equation can be derived:

$$V_g-(V_{in}-I_o*R_o)>V_{th};$$

As the current $I_o$ passes through the resistor between the source terminal of this power transistor and the ground terminal (e.g. one of the resistors Rx1, Rx2 and Rx3), it can be obtained that $I_o=(V_x/R_x)$. By substituting $I_o=(V_x/R_x)$ into the above equation, the following equation can be obtained:

$$V_g - \left(V_{in} - \frac{V_x}{R_x} * R_o\right) > V_{th}$$

where $R_x$ represents the resistance of the resistor in the aforementioned any linear current regulator (e.g. one of the resistors Rx1, Rx2 and Rx3), and $V_x$ represents a certain voltage Vx within the voltages {Vx} that corresponds to this linear current regulator. Given that:

$$V_g = \sqrt{\frac{V_x}{k*R_x}} + V_{th} + V_x$$

where k represents a conduction coefficient. By substituting the above equation into the previous equation thereof, the following equation can be obtained:

$$\sqrt{\frac{V_x}{k*R_x}} + V_{th} + V_x - \left(V_{in} - \frac{V_x}{R_x} * R_o\right) > V_{th}$$

By rearranging the above equation, the following equation can be obtained:

$$V_x\left(1 + \frac{R_o}{R_x}\right) + \sqrt{\frac{V_x}{k*R_x}} > V_{in}$$

By substituting $V_{in}=V_o+V_d$ into the above equation, the following equation can be obtained:

$$V_x\left(1 + \frac{R_o}{R_x}\right) + \sqrt{\frac{V_x}{k*R_x}} > V_o + V_d$$

It can be seen from the above equation that, when $R_o$ and $V_o$ are fixed, the drain voltage $V_d$ of the power transistor may be modulated or adjusted by adjusting $V_x$ and $R_x$, and thereby "$V_{in}=V_o+V_d$" may be modulated or adjusted. For example, by adjusting the voltage $V_x$ and the resistor $R_x$, the gate voltage $V_g$ of the power transistor may be adjusted.

Based on the integrated feed-forward control architecture and the associated parameter adjustment, the present invention can perform proper control on the operations of the linear current regulators, and more particularly, can minimize the overall power consumption while maintaining the uniform brightness of the LED light source. There are various advantages provided by the present invention, for example: the associated parameters can be easily designed; the design of feedback control signals is not related to transistor characteristics and is not influenced by temperature characteristics; when the characteristics of the load LEDs vary, the driving voltages of the current regulators can be adjusted in real time, to make the current regulators operate at the optimal efficiency point; it is easy to implement the feed-forward control circuit; and even if the number of the LED-linear current regulator combination circuits formed by the LED modules and the linear current regulators increases as the number of the sets of LEDs (e.g. the set count of the sets of LEDs) increases, the circuit efficiency optimization can still be carried out.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) driving circuit, comprising:
    a power supply circuit, having a power terminal and a ground terminal, the power supply circuit arranged to provide power to a first set of LEDs and a second set of LEDs;
    a first linear current regulator and a second linear current regulator, respectively coupled to a corresponding set of LEDs, wherein the first linear current regulator is coupled in series to the first set of LEDs and the second linear current regulator is coupled in series to the second set of LEDs, wherein each linear current regulator and the corresponding set of LEDs are coupled between the power terminal and the ground terminal of the power supply circuit, and said each linear current regulator comprises:

a comparator, having a first input terminal, a second input terminal and an output terminal;

a power switch, having a first terminal, a second terminal and a control terminal respectively coupled to the corresponding set of LEDs, the second input terminal and the output terminal of the comparator; and a resistor, coupled between the second terminal of the power switch and the ground terminal; and a control circuit, coupled to the first linear current regulator and the second linear current regulator, the control circuit arranged to control the first linear current regulator and the second linear current regulator to respectively drive the first set of LEDs and the second set of LEDs, to make a first current and a second current respectively passing through the first set of LEDs and the second set of LEDs be substantially equal to each other, wherein the control circuit comprises:

a detection circuit, coupled to a node between the corresponding set of LEDs and said each linear current regulator, the detection circuit arranged to perform detection according to a voltage signal at the node, to generate a detection signal;

a first parameter control circuit, arranged to control a first parameter of said each linear current regulator; and a second parameter control circuit, coupled to the detection circuit, the second parameter control circuit arranged to control a second parameter of said each linear current regulator according to the detection signal;

wherein the first input terminal and the output terminal of the comparator are respectively coupled to the first parameter control circuit and the second parameter control circuit within the control circuit, and the first parameter and the second parameter represent respective voltages of the first input terminal and the output terminal of the comparator, respectively.

2. The LED driving circuit of claim 1, wherein the first set of LEDs and the second set of LEDs each comprise multiple electrically connected to each other in series.

3. The LED driving circuit of claim 1, wherein the detection circuit performs the detection according to the voltage signal at the node to generate the detection signal, for the control circuit to perform feed-forward control for said each linear current regulator.

4. The LED driving circuit of claim 3, wherein the detection circuit comprises:

a first sub-circuit and a second sub-circuit corresponding to the first linear current regulator and the second linear current regulator respectively, wherein a sub-circuit within the first and the second sub-circuits that corresponds to said each linear current regulator comprises:

a diode, having a first terminal and a second terminal, wherein the second terminal of the diode is coupled to the node;

an error amplifier, having a first input terminal, a second input terminal and an output terminal, wherein the first input terminal and the second input terminal of the error amplifier are coupled to the first terminal of the diode and a reference voltage respectively, and the output terminal of the error amplifier outputs the detection signal; and a resistor, coupled between the first input terminal and the output terminal of the error amplifier.

5. The LED driving circuit of claim 3, wherein the first parameter control circuit is coupled to the detection circuit and generates a reference voltage; and the detection circuit performs the detection based on the reference voltage, to generate the detection signal.

6. The LED driving circuit of claim 1, wherein the power switch is implemented as a transistor.

7. The LED driving circuit of claim 1, wherein the comparator is implemented as an operational amplifier.

8. A feed-forward control driver for driving multiple sets of light-emitting diodes (LEDs), comprising:

a power supply circuit, having a power terminal and a ground terminal, the power supply circuit arranged to provide power to said multiple sets of LEDs;

a plurality of linear current regulators, wherein each linear current regulator of said plurality of linear current regulators is coupled to a corresponding set of LEDs of said multiple sets of LEDs, and is coupled between the power terminal and the ground terminal of the power supply circuit; and a control circuit, coupled to said plurality of linear current regulators, and arranged to control said plurality of linear current regulators in order to drive said multiple sets of LEDs by using dynamically adjusted currents respectively, wherein the control circuit performs feed-forward control upon said plurality of linear current regulators, in order to achieve an optimal performance of the feed-forward control driver.

9. The feed-forward control driver of claim 8, wherein each set of LEDs of said multiple sets of LEDs comprises multiple LEDs coupled in series, and is driven by one of the dynamically adjusted currents.

10. The feed-forward control driver of claim 8, wherein said each linear current regulator comprises:

a comparator, having a first input terminal, a second input terminal and an output terminal, wherein the first input terminal and the output terminal of the comparator are coupled to the control circuit;

a power switch, having a first terminal, a second terminal and a control terminal, coupled to said corresponding set of LEDs, the second input terminal and the output terminal of the comparator respectively; and a resistor, coupled between the second terminal of the power switch and the ground terminal.

11. The feed-forward control driver of claim 10, wherein the control circuit comprises:

a detection circuit, coupled to a node between said corresponding set of LEDs and said each linear current regulator, the detection circuit arranged to perform detections according to a voltage signal on the node to generate a detection signal;

a first parameter control circuit, arranged to control a first parameter of said each linear current regulator; and a second parameter control circuit, coupled to the detection circuit, and arranged to control a second parameter of said each linear current regulator according to the detection signal;

wherein the first input terminal and the output terminal of the comparator are coupled to the first parameter control circuit and the second parameter control circuit in the control circuit respectively, and the first parameter and the second parameter represent respective voltages of the first input terminal and the output terminal of the comparator.

12. The feed-forward control driver of claim 10, wherein the power switch is implemented as a transistor.

13. The feed-forward control driver claim 10, wherein the comparator is implemented as an operational amplifier.

14. The feed-forward control driver of claim 8, wherein the control circuit comprises:
a detection circuit, coupled to a node between said corresponding set of LEDs and said each linear current regulator, the detection circuit arranged to perform detections according to a voltage signal on the node in order to generate a detection signal, for the control circuit to perform feed-forward control upon said each linear current regulator.

15. The feed-forward control driver of claim 14, wherein the detection circuit comprises:
a plurality of sub-circuits corresponding to said plurality of linear current regulators, respectively, wherein one sub-circuit of said plurality of sub-circuits comprises:
a diode, having a first terminal and a second terminal, wherein the second terminal of the diode is coupled to the node;
an error amplifier, having a first input terminal, a second input terminal and a output terminal, wherein the first input terminal and the second input terminal of the error amplifier are coupled to the first terminal of the diode and a reference voltage, respectively, and
the output terminal of the error amplifier is arranged to output the detection signal; and
a resistor, coupled between the first input terminal and the output terminal of the error amplifier.

16. The feed-forward control driver of claim 14, wherein the control circuit further comprises:
a first parameter control circuit, coupled to the detection circuit, and arranged to control a first parameter of said each linear current regulator and generate a reference voltage, wherein the detection circuit performs detections based on the reference voltage in order to generate the detection signal; and
a second parameter control circuit, coupled to the detection circuit, and arranged to control a second parameter of said each linear current regulator according to the detection signal.

17. The feed-forward control driver of claim 16, wherein said each linear current regulator comprises:
a comparator, having a first input terminal, a second input terminal and a output terminal, wherein the first input terminal and the output terminal of the comparator are coupled to the first parameter control circuit and the second parameter control circuit in the control circuit respectively, and the first parameter and the second parameter represent respective voltages of the first input terminal and the output terminal of the comparator.

18. The feed-forward control driver of claim 17, wherein said each linear current regulator further comprises:
a power switch, having a first terminal, a second terminal and a control terminal, coupled to said corresponding set of LEDs, the second input terminal and the output terminal of the comparator respectively; and
a resistor, coupled between the second terminal and the ground terminal of the power switch.

* * * * *